US006816977B2

(12) United States Patent
Brakmo et al.

(10) Patent No.: US 6,816,977 B2
(45) Date of Patent: Nov. 9, 2004

(54) POWER REDUCTION IN COMPUTING DEVICES USING MICRO-SLEEP INTERVALS

(75) Inventors: Lawrence Sivert Brakmo, Discovery Bay, CA (US); Deborah Anne Wallach, Emerald Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 477 days.

(21) Appl. No.: 10/004,718

(22) Filed: Dec. 3, 2001

(65) Prior Publication Data

US 2003/0105983 A1 Jun. 5, 2003

(51) Int. Cl.$^7$ ............................................. G06F 1/30
(52) U.S. Cl. ...................... 713/323; 713/300; 713/320; 713/321; 713/322; 713/324; 713/330
(58) Field of Search ................. 713/300, 310, 713/321, 322, 323, 324, 330

(56) References Cited

U.S. PATENT DOCUMENTS

| | | | |
|---|---|---|---|
| 5,239,652 A | | 8/1993 | Seibert et al. |
| 5,623,677 A | | 4/1997 | Townsley et al. |
| 5,754,869 A | | 5/1998 | Holzhammer et al. |
| 5,799,256 A | * | 8/1998 | Pombo et al. ............... 455/574 |
| 5,822,597 A | * | 10/1998 | Kawano et al. .............. 713/323 |
| 5,913,067 A | * | 6/1999 | Klein ........................... 713/300 |
| 5,983,355 A | | 11/1999 | Kenny et al. |
| 6,118,306 A | | 9/2000 | Orton et al. |
| 6,158,012 A | | 12/2000 | Watts, Jr. |
| 6,192,479 B1 | | 2/2001 | Ko |
| 6,282,614 B1 | * | 8/2001 | Musoll ......................... 711/122 |
| 6,457,134 B1 | * | 9/2002 | Lemke et al. ............... 713/323 |
| 6,516,421 B1 | * | 2/2003 | Peters ......................... 713/502 |
| 6,574,740 B1 | * | 6/2003 | Odaohhara et al. ......... 713/323 |

OTHER PUBLICATIONS

Viredaz, et al. "Power Evaluation of a Handheld Computer: A Case Study", WRL Research Report 2001/1, Compaq Western Research Laboratory, May 2001.
Kamijoh, et al. "Energy trade–offs in the IBM Wristwatch computer", IEEE, 2001, pp. 133–140.
Bartlett et al., "The Itsy Pocket Computer", WRL Search Report 2000/6, Compaq Western Research Laboratory, Oct. 2000.

* cited by examiner

*Primary Examiner*—A. Elamin

(57) ABSTRACT

Short duration micro-sleep or nap periods reduce the power consumption of a computing device. In use, the computing device determines a first duration to a next expected event in the computing device, and compares the first duration to a minimum micro-sleep duration. If the first duration is greater than or equal to the minimum duration, then the processor enters a processor sleep state for a sleep duration. The processor then wakes up and returns to a running state at the end of the sleep duration and before the next expected event. This permits the use of a low-power sleep state while giving the appearance that the computing device is functional. As an additional requirement before entering micro-sleep, the current or recent processor load may be evaluated to determine whether a micro-sleep interval is appropriate.

30 Claims, 2 Drawing Sheets

POWER REDUCTION IN COMPUTING DEVICES USING MICRO-SLEEP INTERVALS

BACKGROUND OF THE INVENTION

The present invention relates generally to the reduction in the power consumption of computing systems.

With the rise in prominence of mobile or portable computing devices, renewed attention has been given to the power consumption of such devices. If the power consumed by a mobile device can be reduced, the device's battery life will improve. Alternatively, more complex or faster processing can be achieved without a corresponding reduction in battery life.

While perhaps less obvious, power reduction in traditional "non-mobile" computing devices is also a desirable goal. For example, power costs and heat dissipation can be reduced in non-mobile applications by applying power reduction methods.

Most modern microprocessors provide power saving modes to reduce power consumption under low load conditions. For example, some processors have an idle state that consumes less power than the running state and in which no computation occurs. There is low latency to enter and exit the idle state, in the order of a few clock cycles. The processor changes from the idle to running state due to an interrupt, for example a built-in timer interrupt. On some processors, such as the Intel StrongArm SA-1100, the idle state is achieved by stopping the clock to the processor core.

Also provided may be a sleep state that consumes much less power than the idle state. There is usually high latency to enter or exit (or both) the sleep state, in the order of hundreds of clock cycles up to tens of milliseconds. The processor changes state from sleeping to running due to an interrupt. In processors with integrated subsystems, such as an LCD controller and communications subsystems, these subsystems are usually turned off during the sleep state. On the SA-1100, the latency to exit sleep is between 16 and 150 milliseconds, and all parts of the processor, other than the real time clock and interrupt controller are turned off. The sleep state may be used by the operating system when it the system has not been used for a while. For example, current handheld computers may power down if no user input is received for a number of minutes.

SUMMARY OF THE INVENTION

According to one aspect of the invention there is provided a method of reducing power consumption in a computing device including a processor, the method comprising:
  determining a first duration to a next expected event in the computing device;
  comparing the first duration to a minimum duration; and
  if the first duration is greater than or equal to the minimum duration, then:
    entering a processor sleep state for a sleep duration; and
    entering a processor running state upon expiry of the sleep duration and before the next expected event.

The method may further comprise entering the processor running state before expiry of the sleep duration upon receipt of a user input. Further, at least two expected events may be synchronizing to increase a duration to the next expected event.

According to another aspect of the invention, the processor sleep state is entered only if the processor is spending more than a certain percentage of its time in a processor idle loop. Further, the sleep duration may be defined to be less than or equal to one second.

According to yet another aspect of the invention, the computing device includes a display device upon which an image is displayed during the sleep duration. The display device may be switched off if user input is not received within a predetermined shutoff time.

Still further, the computing device may include a touch input device that remains enabled during the sleep period. As for the display device, the touch input device may be disabled if user input is not received within a predetermined shutoff time.

According to another aspect of the invention, the minimum sleep duration is the duration below which it would consume more energy to enter the sleep state and subsequently enter the running state than it would be consumed to idle the processor for the same duration. If the first duration is less than the minimum duration, the processor may be idled for the first duration. Idling the processor is typically accomplished by stopping a processor clock.

According to another aspect of the invention, provided is a computing device comprising a processor, the computing device in use reducing power consumption by:
  determining a first duration to a next expected event in the computing device;
  comparing the first duration to a minimum duration; and
  if the first duration is greater than or equal to the minimum duration, then:
    entering a processor sleep state for a sleep duration; and
    entering a processor running state upon expiry of the sleep duration and before the next expected event.

These and other advantages and aspects of the invention will become apparent to those skilled in the art upon a reading of the following detailed description of the invention, in conjunction with the accompanying drawings.

DETAILED DESCRIPTION OF EMBODIMENTS OF THE INVENTION

Figure 1:
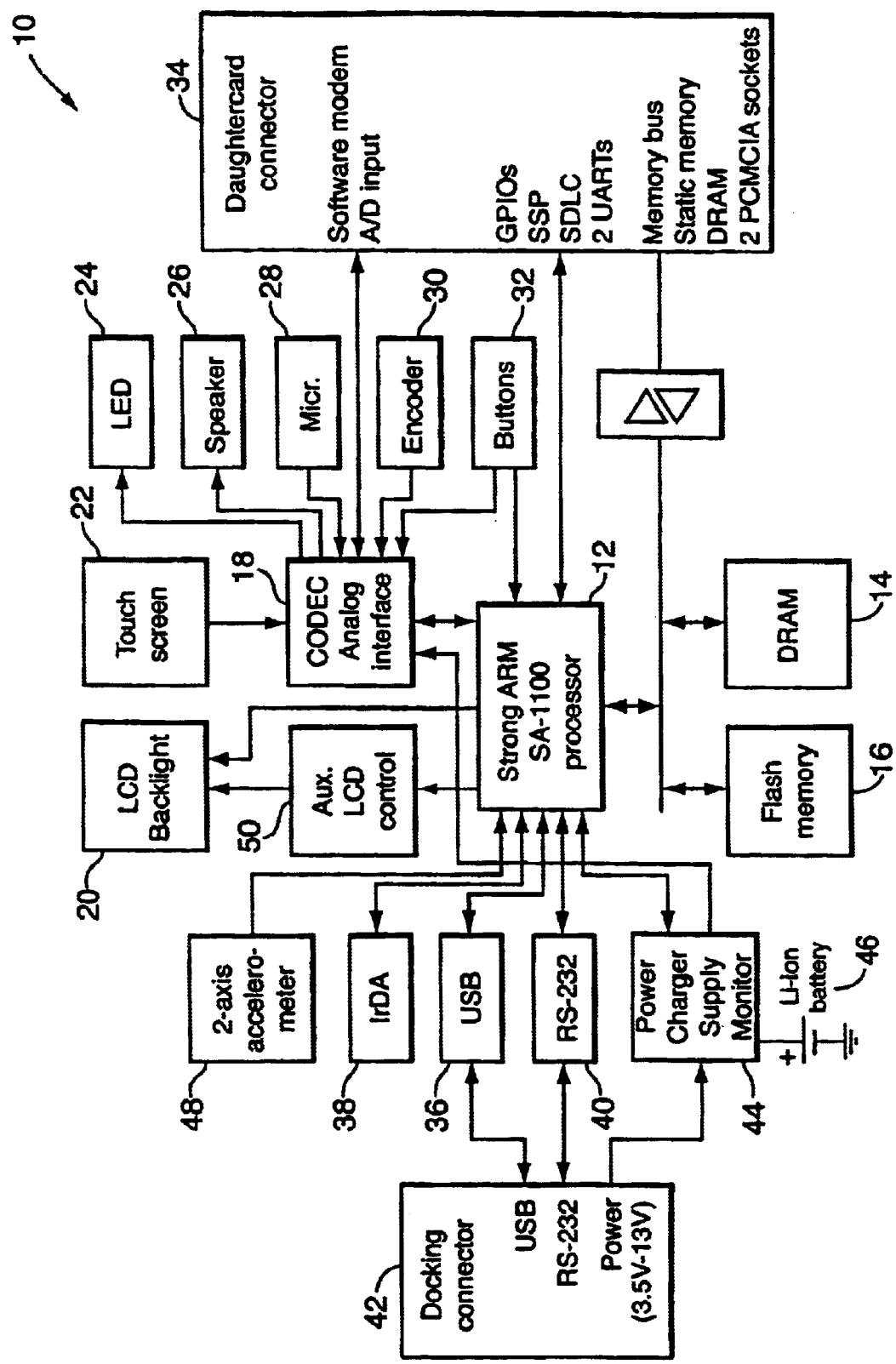
FIG. 1 illustrates a processing system architecture according to the invention.

Turning now to FIG. 1, shown is a mobile or portable computing system 10 according to the invention. It will be noted that the illustrated architecture of the computer system is being used for exemplary purposes only, and one of ordinary skill in the art will appreciate that many changes could be made to the system without departing from the spirit or scope of the invention. In particular, the architecture shown in FIG. 1 was conceived as research and development prototype, and a commercial embodiment may differ in the type, number or arrangement of components. Also, while the power saving techniques of the invention are described with reference to a portable or mobile computing device, it will be appreciated that the invention may be applied in other systems.

As shown in the figure, the computer system 10 includes a processor 12, non-volatile flash memory 16 for permanent storage and bootup, volatile DRAM memory 14, a codec 18 that provides an i/o interface to various input/output devices, a number of communications interfaces, a display 20 and a power system. The system 10 typically runs a conventional operating system that provides that is modified to provide the power-saving features of the invention.

In the illustrated embodiment, the DRAM memory 14 has a self-refresh feature that may be enabled to permit the DRAM to retain its data when the processor 12 enters the sleep mode.

The codec 18 provides an i/o interface between the processor 12 and a number of I/O devices including a touch screen 22 that may be integrated with or mounted to the display 20, an LED 24, a speaker 26, a microphone 28, a position encoder 30 (e.g. for a scrolling wheel or ball), and one or more input keys or buttons 32. These I/O devices are used in conventional fashion to provide user interaction. For example, the touch screen 22 may be used to receive input from a stylus, the microphone 28 may be used for voice input, and the speaker may be used for audio output.

Also included in the system 10 is a daughtercard 34 that may be used for expansion purposes (e.g. to add additional memory or modules having specific functionality) or to provide additional communications interfaces such as RF or other wireless connectivity.

The communications interfaces include industry-standard interfaces such as a USB interface 36, infra-red interface 38 and an RS-232 interface 40. The USB and RS-232 interfaces are coupled to a docking connector 42 that provides connectivity for these interfaces.

The system's power subsystem includes a power module 44 that includes a battery supply monitor and a charger, and three regulated power supplies, one for main and processor core voltages, and one linear regulator for the analog section (i.e part of the codec 18 and any analog inputs and outputs connected to the codec 18 such as the speaker 26, microphone 28, touch screen 22 etc.). The power module 44 controls the charging and monitors the usage of a rechargeable battery 46. The power module 44 implements all the customary safety mechanisms for rechargable batteries, including over-voltage, over temperature and over-current. A "gas gauge" circuit integrates the power into and out of the battery to continuously monitor the battery's state of charge. The power supply module receives external power for recharging via the docking connector 42 when the computer system 10 is connected to a corresponding external connector, for example when the computer system is docked in a docking station. As before, system 10 is a device that includes rechargeable batteries, but it will be appreciated that the invention may be implemented in a device that operates on a different type of power source or uses a non-rechargeable or disposable batteries.

Additional interfaces, I/O devices or other modules may be provided. For example, a two axis accelerometer 48 may be used for orientation-based input.

The processor 12 is an integrated processor. That is, most of the interface and control logic needed for control of or interaction with devices external to the processor are implemented in the processor. While this is convenient for configuring the system 10, modifications may be required to allow aspects of the invention to function correctly. For example, if the display controller and frame buffer are implemented in the processor, it will not be possible in a conventional architecture for an integrated processor to enter a sleep mode while keeping an image on the display.

To provide the necessary functionality to implement aspects of the invention, modifications may be made to typical computer architectures. For example, in the illustrated embodiment, an auxiliary display controller 50 is provided that permits the display of an image on the display 20 while the processor in sleep mode. In an alternative embodiment, the processor 10 is not an integrated processor, and in such a case support for the display of an image when the processor is in sleep mode may not require modifications, or may only require minor modifications, since the display controller will not be integrated with the processor 12 in such a case.

The processor 12 provides a number of power management mechanisms. These include processor support for software controllable clock frequency, as well as two low-power modes: idle mode and sleep mode. In an exemplary implementation of idle mode, a system clock to the processor core is gated off, but the rest of the chip remains powered, including the peripheral device controller hardware. In an exemplary implementation of sleep mode, most of the processor is unpowered, and only a real-time clock and a wake-up circuit remain enabled. An oscillator circuit, used to provide a controlled frequency to drive the system clock, can optionally be left enabled for faster wake-up. The wake-up circuit serves to wake the processor up either upon the expiration of a sleep interval, or upon the occurrence of an external event, for example a button press.

As mentioned above, the processor system clock may be unpowered when the processor is in the sleep state, with the real time clock being the only timing device that remains active to reawaken the processor. If the real time clock only has a resolution of one second, the system 10 may need to be modified to provide processor wake-up after the micro-sleep intervals contemplated herein, which will most often be less than one second in duration. This can be accomplished either by modifying the real time clock as discussed below to have the necessary (for example, millisecond) resolution or by using an external clock that keeps running when the system is in micro-sleep and which can be programmed to provide interrupts at the required resolution. The former method is preferred but not required..

On many processors, including the SA-1100, the real time clock (RTC) has a nominal resolution of 1 second. However, many processors, including the SA-1100, provide "trimming" registers whose purpose is to trim the RTC so that it ticks exactly once a second (due to inherent variability of crystals, the default frequency of the RTC may be a little less or a little more than 1 sec). On the SA-1100, the RTC frequency can be adjusted through the RTC Trim Register. Although it is meant to adjust the RTC so that its frequency is 1 tick per second, it can also be used to increase the frequency of the RTC to between 100 and 1000 ticks per second.

During sleep mode, the display 20 may either be disabled, or may driven using the auxiliary display controller 50. Additionally, most peripherals can be individually left on or turned off for the time when the processor 12 is in sleep mode. For example, the codec 18 will normally keep the touch screen enabled during a micro-sleep period (as described in more detail below) so that the processor can be woken by touch input, but will disable the touch screen upon entering what is expected to be an extended sleep period (e.g. when the user powers the system down or the system enters sleep after an extended period of inactivity) to avoid the system being woken by inadvertent contact with the touchscreen.

According to one aspect of the invention, the processor 10 is put into a sleep state for a short duration while the system is being lightly used. The sleep periods are short sleep periods (typically one second or less, and as little as 40 ms or less) interspersed with awake periods that allow the system to complete its processing requirements. Such "micro-sleeps" or "naps" provide power savings without interfering with the user experience. For example, it may be possible with the invention for the processor to enter a sleep state between strokes of a stylus on the touch screen, and the power savings will thus be transparent to a user, who will still see the relevant image on the display, and will be able to continue interacting with the computer despite the repeated entering and exiting of the sleep state.

Various factors are taken into account to determine when the processor 12 can enter the sleep mode, which generally equate to a condition in which the processor is not being used very much. One of the factors that may be used in this determination is that no actions are scheduled in the processor 12 for a period of X ms (milliseconds) or more. X is a break-even point for sleep duration. That is, sleeping for a duration of less than X costs more energy than not sleeping at all, whereas sleeping for a duration of more than X uses less power than not sleeping. Additionally, another factor is whether any peripheral devices that are implemented in the processor 12 and will be shut down when the processor 12 enters sleep mode don't need processor intervention for X ms or more. Also, if a peripheral device is busy, this may prevent entering of the sleep state, either as a result of a need for substantially uninterrupted processor time, or as a result of the peripheral device not being able to function at all without the processor being awake.

As a general proposal, when I/O components such as audio processing, an LCD controller or a serial port are implemented or controlled by the processor 12, and if these devices are currently active and they would be disabled if the processor enters the sleep mode, then either 1) they must be able to stand an interruption of length dT (the micro-sleep duration) or 2) an external device can take over the functionality of the I/O device for the duration of the micro-sleep. As mentioned above, in the architecture illustrated in FIG. 1, the auxiliary display controller 50 contains a built-in frame buffer that permits an image to be shown on the LCD display 20 when the processor 12 is in sleep mode.

Additionally, heuristics may be used to estimate whether or not the processor load is currently light and is expected to remain light. For example, if the processor is spending more than Y % of its time (for example, 80%) in the operating system idle loop, this can be taken as an indication that the system 10 is being used sufficiently lightly enough to enter the sleep mode. Of course, the values of X and Y will depend on the particular implementation and system components, and may be determined in a number of different ways. For example, every so often (e.g. 10 to 100 times per second, or upon entering the processor idle loop), the processor 12 may determine Y from a value taken over an interval of time, or take a moving average over several previous intervals of time, or a combination of these, or other methods.

Figure 2:
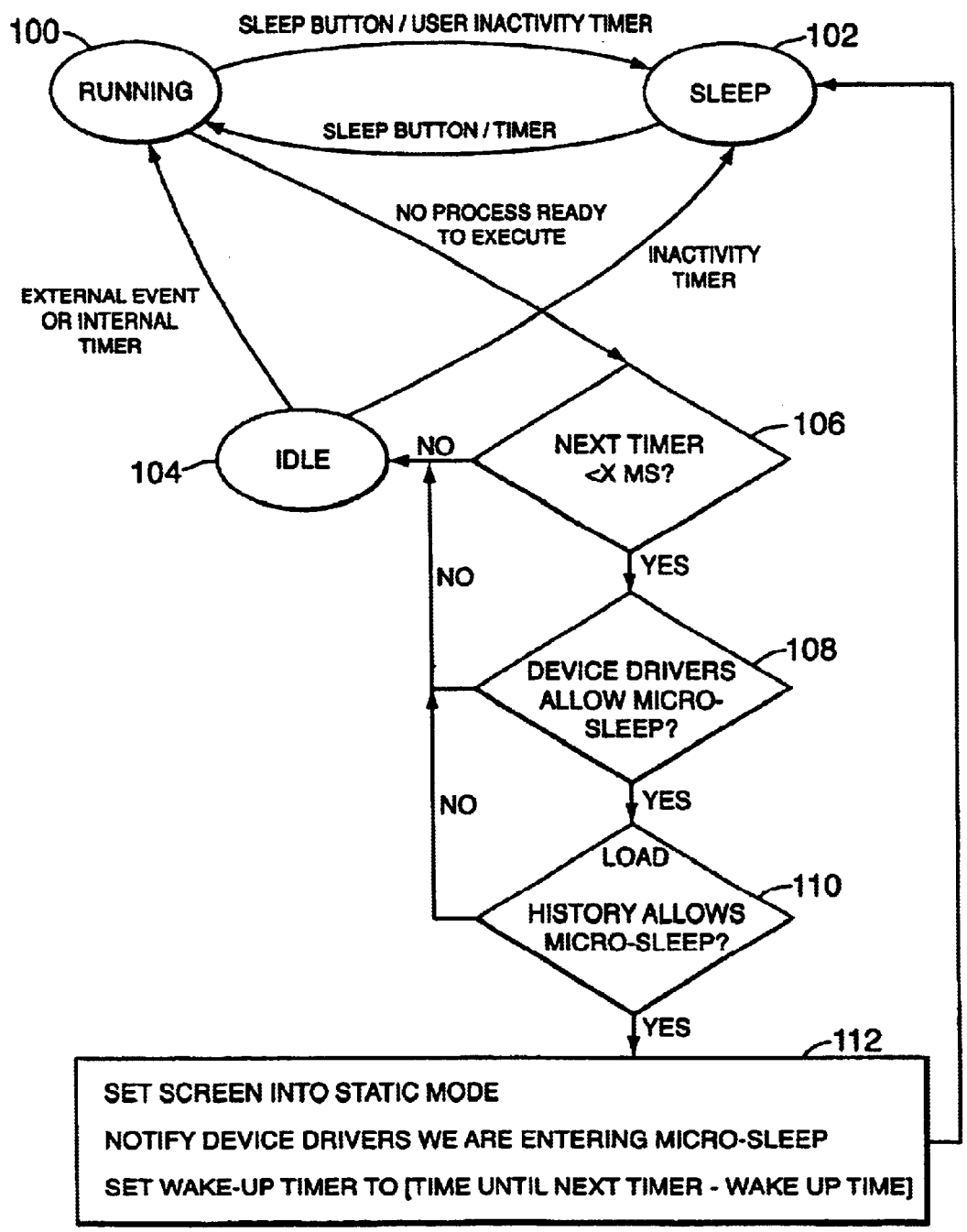
FIG. 2 illustrates a state diagram for the system architecture of FIG. 1.

FIG. 2 is a state diagram that illustrates exemplary functioning of the computing system shown in FIG. 1. As can be seen from the figure, there are three primary states, a running state 100, a sleep state 102 and an idle state 104. The particulars of these three states have been described generally above. A complete power off state may also be provided, but this is generally not used in the case of mobile devices since most mobile devices provide some kind of alarm or notification feature.

Considering first the running state 100, in this state the system 10 is operating normally. The processor 12 is powered up and is receiving a clock signal, and the system 10 is to all intents and purposes fully functional. Various power-saving techniques may still be applied in this state though, for example, the processor clock frequency may be reduced, or the processor voltage may be reduced.

In the running state 100, if the user presses the sleep or off button, the system 10 will move into the sleep state 102. Alternatively, if the system 10 detects no user activity for a specified time, the system 10 will move into the sleep state 102 upon the expiry of a user inactivity timer. The duration of the user inactivity timer is often a user-definable parameter, and is typically long enough (e.g. 15 seconds to 5 minutes) so that the system will not often shut off unexpectedly when the user is interacting with the system. Also, the user-inactivity timer may be disabled by certain applications. For example, if the user is viewing video on the display or listening to audio on the system 10, the user inactivity timer may be disabled for the duration of the video or audio to prevent the interruption thereof. That is, in certain cases, the lack of user input is not indicative of the user not interacting with the system.

When entering the sleep state 102 from the running state 100, the display 20 will typically be switched off, and the touch screen 22 will typically be disabled to prevent accidental wake-up. However, certain events, such as the expiry of an event timer (e.g. an appointment reminder or other scheduled event) or a user pressing a button may return the system 10 to the running state 100.

While in the running state 100, the processor periodically checks 106 to see when a next scheduled event is set to take place. This check typically takes place when no processes are ready to execute, or when the processor enters an operating system idle loop, but may take place at other times too. Scheduled events are normally indicated by timers, and the processor 12 thus checks when the next timer is set to expire. If the next timer is set to expire in less than X ms, then the processor enters the idle state 104. If the next timer is set to expire in more than X ms, the processor queries 108 the device drivers to determine whether or not the device drivers can tolerate a micro-sleep. If the device drivers can tolerate a micro-sleep duration that is shorter than the time to next timer expiry but longer than X ms, the micro sleep period can be reduced to this shorter duration. If the device drivers can't tolerate a sleep, the system 10 enters the idle state 104.

If the drivers can tolerate a micro-sleep, the processor then determines 110 from a processor load history whether or not a micro-sleep can be tolerated. This step may be considered to be optional, but it may be a good practice to include it. For example, if an analysis of the load history indicates that some type of interruption or input (e.g. user input) is likely to take place in less than X ms, going into the sleep state carries with it a reasonable probability that the system 10 will be awoken in less than X ms (which consumes more power than not sleeping) and it would thus appear to be less desirable to enter the sleep state. On the other hand, if the analysis of the load history indicates that likely processor load is low (indicating a low likelihood of the system awakening in less than X ms), then entering the sleep state would appear to be more desirable. As discussed above, there are various ways of evaluating the system load. If the evaluation of the system load indicates that micro-sleep is not appropriate, the system 10 goes into the idle state 104. From the idle state 104, the processor may move into the sleep state 102 upon expiration of a user inactivity timer. Moving from the idle state 104 to the sleep state 106 requires processor action, but this well-known transition is not shown in the state diagram to avoid complicating the diagram unnecessarily.

If the evaluation of the system load indicates that micro-sleep is appropriate, then the system 10 performs any necessary actions 112 before entering micro-sleep. In the system of FIG. 1, this involves instructing the auxiliary display controller 50 to display an image from the built-in frame buffer (i.e. the display controller enters a static mode in which a fixed image is displayed), notifying any other device drivers that the processor 12 will not be available for the sleep duration, and setting a timer to wake up the processor before the next scheduled event (i.e. at the end of the micro-sleep). In most cases, the duration of the micro-sleep is the time to next timer expiry less the time it takes the processor 12 to wake up. Also, the image displayed on the display 20 is typically a static image, but in other implementations the display controller 50 may be configured to display a moving image that does not depend on processor use. For example, a predetermined sequence of static images may be displayed to provide a moving image.

When entering the sleep mode for a micro-sleep, the touch screen remains active for user input, and the display 20 displays an image. Accordingly, the user perceives that the system 10 is functional while the processor 12 is actually in a sleep mode. If a user interaction occurs before the expiry of the micro-sleep period, the system 10 returns to the running state 100. Similarly, the wake up timer that was set prior to entering the micro-sleep will return the processor 12 to the running state 100 just before the next scheduled event is set to take place, which will allow the next scheduled event to take place normally. Accordingly, the use of micro-sleep periods is transparent to the user.

The actual duration of micro-sleep will vary depending on the time of the next scheduled event and the amount of user interaction. As an example only, if the value of X is 40 ms, the processor could sleep for as little as this minimum time. In another example, if a user is entering data using a stylus on the touch screen, with a break of 300 ms between every touch of the stylus, and it takes 150 microseconds for the processor to enter the sleep state, and 10 microseconds for the processor to exit the sleep state, the processor 12 could sleep for most of the duration of the pause between each stylus stroke. Still further, if there is no user activity but the inactivity timer has not expired, and all that is occurring is the updating of the second hand or second counter on a clock being displayed, the processor could sleep for almost the entire duration of each second between clock display updates. In yet another example, the next scheduled event could be the expiry of the user inactivity timer, and the processor 12 could engage in a micro-sleep, with the "next scheduled event" being the powering down of the display 20 and the disabling of the touch screen 22, and the subsequent return to the sleep state 102 from the running state 100 as a result of the expiry of the user inactivity timer.

In most circumstances however, it may be desirable to set an upper limit on the duration of the micro-sleep interval, so that (in the event that there is a relatively long interval to the next scheduled event), the processor 12 will be awoken periodically to perform housekeeping tasks. In this regard, it is believed that a maximum sleep duration of between approximately 0.5 seconds and 2 seconds is acceptable, with 1 second being a convenient maximum sleep duration to allow the updating of relevant items, for example, a clock display with one second resolution. It is also believed that the energy cost of waking up briefly once a second is small, and that the added advantage of being able to perform housekeeping outweighs the small energy savings that would be gained by having individual micro-sleep periods of much longer than a second. Of course, upon completion of any housekeeping tasks, the processor 12 may repeatedly return to micro-sleep in accordance with the state diagram shown in FIG. 2 if the conditions for micro-sleep are met.

Still further, it is desirable, where possible, to synchronize timers to take advantage of the power savings offered by micro-sleep. For example, if two timers have a recurring expiry of 75 ms, if they were offset by 35 ms and the minimum sleep duration was 40 ms, the processor would not enter micro-sleep. However, if the timers were synchronized, the processor would be able to enter repeated micro-sleeps of close to 75 ms. Also, synchronized timers would be more efficient, since the processor could deal with multiple scheduled events at one time, and thus wake up less often. To provide synchronized timers, software setting a timer would need to be modified so that a request to set a timer could be designated as a hard timer (e.g. "I really need the timer to expire in 500 ms") or as a soft timer (e.g. "I need a recurring timer expiring at 500 ms intervals but I'm not really that worried about exactly when the first interval starts" or "I need a timer to expire some time in the next 100 to 300 ms.") The operating system could then check for existing timers with which to synchronize the new timers, and set the new timers appropriately.

In a further embodiment, the processor is put to sleep regardless of whether there are timers scheduled to expire in the near future. This is known as "hard" micro-sleep for convenience. The reason for performing hard micro-sleep is that, although the processor load may be low, badly-written applications may be setting up many timers that either prevent "soft" micro-sleep (as described above) or reduce the sleep period (and thus the energy saved) considerably. These badly-written applications may be able to tolerate late servicing of their timers.

To determine whether or not hard sleep may be useful, the operating system may monitor the processor load and the frequency of calling of timers by applications. Upon identifying an offending application, the system 10 may prompt the user for permission to enter the sleep state 102 in conflict with a timer expiry by the offending application. If the user agrees, a user-settable preference is set marking the offending application as one whose timers can be overridden, and the user may also be advised that the user-settable preference can be reset to a "don't ignore" setting should the application not function satisfactorily. As an alternative (or in addition to) a user being able to select hard sleep for offending applications, the system 10 may implement hard sleep as a response to a low battery condition.

As an alternative to the system 10 itself determining the identity of offending applications, the operating system could be provided with a list of offending applications that are able to tolerate hard micro-sleep. This list could be provided with the operating system as originally configured, and it may be updated subsequently using known synchronization techniques in the portable computing arts, or via wired or wireless download from a network resource. As before, user approval may or may not be requested before ignoring timers set by the list of offending applications.

In operation, the hard sleep embodiment functions in the same manner as described above with reference to FIG. 2 except that only non-offending timers are considered in the initial determination of duration to the next timer expiry, and a further decision block is included. In this decision block, timers set by offending applications are considered. If no offending timer is set to expire before the next expiring timer set by a non-offending application, the system proceeds to micro-sleep as before. If an offending application has set a timer, the system 10 can take various actions. Firstly, the system 10 can proceed to micro-sleep as before, ignoring the offending timer(s). Alternatively, the system can verify that a certain number of timers by the offending application have expired and been dealt with in a recent interval, and, on that basis, ignore the offending timer and proceed to micro-sleep. Still further, the application could check the currently set sleep period against a maximum tolerated (or best compromise) hard-sleep period (either generally or for the particular offending application(s)) and, if the currently set sleep period exceeds the hard sleep period, set the sleep period to the maximum tolerated (or best compromise) hard-sleep period. For example, if good power savings can be achieved by sleeping for 200 ms and this does not degrade the performance of an offending application that sets a timer to expire every 30 ms, and the maximum tolerated hard sleep for the offending application is 800 ms, the system could reset a wake up timer that was originally set to 950 ms to either a "best compromise" 200 ms value or to a "maximum tolerated" 800 ms value. Again this can be set by user preference, or the system could switch from "best compromise" to "maximum tolerated" on a low battery condition.

An alternative implementation of hard sleep functions in the same manner as describe above with reference to FIG. 2, except that block 106 is eliminated and block 112 is modified so that the micro-sleep period is set for the longer of a) the time to next timer expiry less the wake up time or b) a fixed sleep period. That is, if it is possible to sleep for a longer period than a fixed period, this is done, otherwise, the processor sleeps for the fixed period. The length of the fixed period may be selected to provide good power savings without substantially degrading system functionality, and will depend on the particular implementation. Upon awaking in this embodiment of hard sleep, the system 10 will return to the running state 100 to perform any necessary actions. If the device driver requirements 108 and load history requirements 110 are again met, the system 10 returns to hard sleep. Alternatively, hard sleep can be defined to take place at regular intervals.

Although the present invention has been described in accordance with the embodiments shown, variations to the embodiments would be apparent to those skilled in the art and those variations would be within the scope and spirit of the present invention. Accordingly, it is intended that the specification and embodiments shown be considered as exemplary only, with a true scope of the invention being indicated by the following claims and equivalents.

What is claimed is:

1. A method of reducing power consumption in a computing device including a processor, comprising:
   determining a first duration to a next expected event in the computing device;
   comparing the first duration to a minimum duration; and
   if the first duration is greater than or equal to the minimum duration, then:
      entering a processor sleep state for a sleep duration; and
      entering a processor running state upon expiry of the sleep duration and before the next expected event.

2. The method of claim 1 further comprising:
   entering the processor running state before expiry of the sleep duration upon receipt of a user input.

3. The method of claim 1 wherein the processor sleep state is only entered if processor load has fallen below a predetermined threshold.

4. The method of claim 1 further comprising:
   synchronizing at least two expected events to increase a duration to the next expected event.

5. The method of claim 1 wherein the processor sleep state is entered only if the processor is spending more than a certain percentage of its time in a processor idle loop.

6. The method of claim 1 wherein the sleep duration is less than or equal to one second.

7. The method of claim 3 wherein the processor load is determined heuristically.

8. The method of claim 1 wherein the computing device includes a display device, the method further comprising:
   displaying an image on the display device during the sleep duration.

9. The method of claim 8 wherein the display device is switched into a static mode during the sleep duration.

10. The method of claim 9 wherein the computing device includes a touch input device, the method further comprising:
    keeping the touch input device enabled during the sleep duration.

11. The method of claim 9 further comprising:
    switching the display device off if user input is not received within a predetermined shutoff time.

12. The method of claim 10 further comprising:
    disabling the touch input device if user input is not received within a predetermined shutoff time.

13. The method of claim 1 wherein the sleep duration is determined by subtracting from the first duration a time needed to enter the processor running state.

14. The method of claim 1 wherein the minimum duration is a duration below which it would consume more energy to enter the processor sleep state and subsequently enter the processor running state than it would be consumed to idle the processor for the same duration.

15. The method of claim 1, comprising:
    idling the processor if the first duration is less than the minimum duration.

16. The method of claim 15 wherein the step of idling the processor comprises the step of stopping a processor clock.

17. A computing device comprising a processor, the computing device in use reducing power consumption by:
    determining a first duration to a next expected event in the computing device;
    comparing the first duration to a minimum duration; and
    if the first duration is greater than or equal to the minimum duration, then:
       entering a processor sleep state for a sleep duration; and
       entering a processor running state upon expiry of the sleep duration and before the next expected event.

18. The computing device of claim 17, wherein the computing device in use:
    enters the processor running state before expiry of the sleep duration upon receipt of a user input.

19. The computing device of claim 18, wherein the computing device in use:
    synchronizes at least two expected events to increase a duration to the next expected event.

20. The computing device of claim 17 wherein the processor sleep state is entered only down if the processor is spending more than a certain percentage of its time in a processor idle loop.

21. The computing device of claim 18 wherein the sleep duration is less than or equal to one second.

22. The computing device of claim 18 further comprising a display device, wherein an image is displayed on the display device during the sleep duration.

23. The computing device of claim 18 further comprising:
    a user input device, the user input device remaining enabled during the sleep duration.

24. The computing device of claim 22 further comprising:
a user input device, the user input device remaining enabled during the sleep duration.

25. The computing device of claim 22 wherein the display device is switched off if user input is not received within a predetermined shutoff time.

26. The computing device of claim 23 wherein the user input device is disabled if user input is not received within a predetermined shutoff time.

27. The computing device of claim 17 wherein the minimum duration is the duration below which it would consume more energy to enter the processor sleep state and subsequently enter the processor running state than it would be consumed to idle the processor for the same duration.

28. The computing device of claim 23 wherein the user input device is a touch input device.

29. The computing device of claim 24 wherein the user input device is a touch input device.

30. The computing device of claim 26 wherein the user input device is a touch input device.

* * * * *